United States Patent [19]

Hooper

[11] Patent Number: 4,684,357

[45] Date of Patent: Aug. 4, 1987

[54] TIMING CHAIN RETRACTOR AND LOCK

[76] Inventor: Buddy D. Hooper, Rte. 2, Box 21, Hastings, Okla. 73548

[21] Appl. No.: 798,002

[22] Filed: Nov. 14, 1985

[51] Int. Cl.[4] ................................................ F16H 7/08

[52] U.S. Cl. ................................................ 474/101

[58] Field of Search ........................ 474/136, 101, 130; 123/90.15; 81/486, 488; 29/156.4 R, 270, 281.6

[56] References Cited

U.S. PATENT DOCUMENTS

| | | | |
|---|---|---|---|
| 2,541,080 | 2/1951 | Lyon | 474/136 X |
| 4,218,939 | 8/1980 | Castoe | 29/281.6 X |
| 4,373,240 | 2/1983 | Castoe | 29/156.4 R |
| 4,457,269 | 7/1984 | Beardmore | 474/101 X |
| 4,525,913 | 7/1985 | Krukowski | 29/270 |

*Primary Examiner*—Stephen J. Novosad
*Assistant Examiner*—Thuy M. Bui
*Attorney, Agent, or Firm*—Kenneth E. Darnell

[57] ABSTRACT

This specification discloses apparatus for locking and retracting the timing chain(s) or belt of overhead cam internal combustion engines. The apparatus consists of essentially two components; an adjustable Retractor and a spring loaded Lock. During maintenance and/or overhaul of the engine and following removal of the Rocker Arm Cover(s), the Lock is compressed and installed between the two sides of the timing chain and seated on top of the crank sprocket. Upon release, the spring of the Lock forces the two sides of the lock to expand and lock the timing chain into position around the crank timing chain sprocket and prevents the engine mounted timing chain tensioner piston from jumping out of detent and falling into the engine oil pan. Utilization of the Lock in the foregoing manner allows for the removal of the engine head which contains the overhead cam and upper timing sprocket without necessitating the removal of the engine front cover, fan, and oil pan. Following removal of the engine head the Retractor is installed at the front of the engine block using two of the engine head bolts to secure the Retractor in position on the two front head bolt holes of the engine block. The cam sprocket is then installed on the Retractor and the Retractor adjusted to tension the timing chain. Upon tensioning of the timing chain, the Lock may be removed, chain tension now being sufficient to maintain the engine mounted timing chain tensioner piston in position and the timing chain secure around the crank sprocket.

9 Claims, 5 Drawing Figures

TIMING CHAIN RETRACTOR AND LOCK

BACKGROUND OF THE INVENTION

The majority of economy compact automobiles and trucks utilize four or six cylinder overhead cam engines. These engines use timing chains or belts. Unless extreme caution is used by the mechanic when inspecting, repairing, or overhauling these overhead cam engines, it is possible for the timing chain or belt and the engine mounted chain or belt tensioner to fall into the engine oil pan. When loss of the timing chain or belt and tensioner occurs, additional mechanic manhours are required by the necessity of removing the fan, engine front cover, oil pan, and on installed engines, the ahead-of-engine plumbing in order to retrieve and reinstall the timing chain and tensioner. While the manufacturers of these four and six cylinder engined vehicles suggest the utilization of a wooden wedge to maintain the timing chain or belt and tensioner in position during engine in-vehicle repair and overhaul, none of these devices allow for rotation of the engine during maintenance operation nor do the devices assure the chain and sprocket relationship required for engine timing.

OBJECTS OF THE INVENTION

With the foregoing conditions in mind, the invention has the following objects in view:

(1) To provide apparatus to securely Lock the timing chain or belt in place as a preliminary to removing the engine head and overhead cam assembly.

(2) To provide apparatus which will retract and tension the timing chain or belt following engine head removal while maintaining the engine mounted chain or belt tensioner in position and the chain or belt secure on the crank sprocket through applied chain or belt tension.

(3) To provide, in apparatus of the kind described, a means of allowing engine revolution while maintaining the proper relationship essential for engine timing between the cam and crank sprockets via the timing chain or belt.

SUMMARY OF THE INVENTION

The foregoing objects are achieved by providing a Chain Tensioner and Lock which includes, as characteristic and essential elements, a triple slotted, inverted Tee-shaped frame equipped with a threaded shaft, handle and hub assembly in addition to a tabbed, spring loaded, Vee-shaped device hinged at its apex.

For a full and more complete understanding of the invention, reference may be made to the following description of the accompanying drawings wherein.

DETAILED DESCRIPTION

Referring now to the illustrations, wherein like reference numbers denote corresponding parts, the various elements of the apparatus will be described along with the mode of operation.

Figure 1:
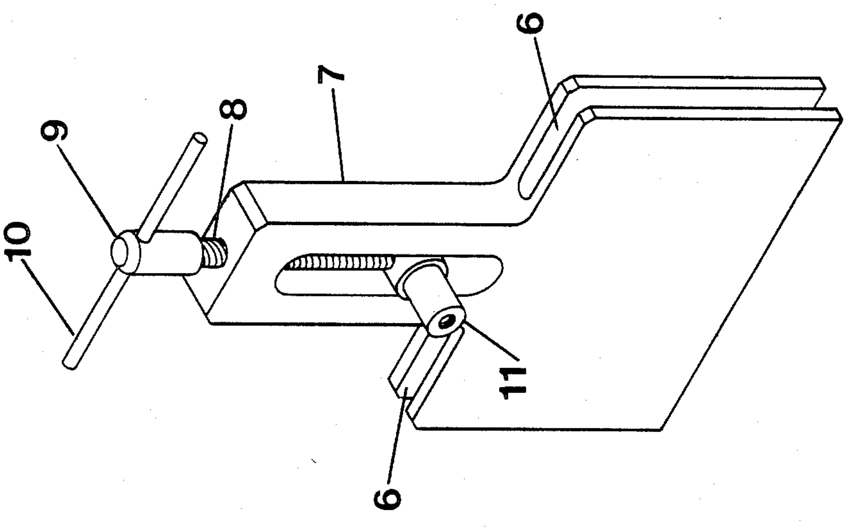
FIG. 1 is an isometric drawing of the front of the Retractor apparatus.
Figure 2:
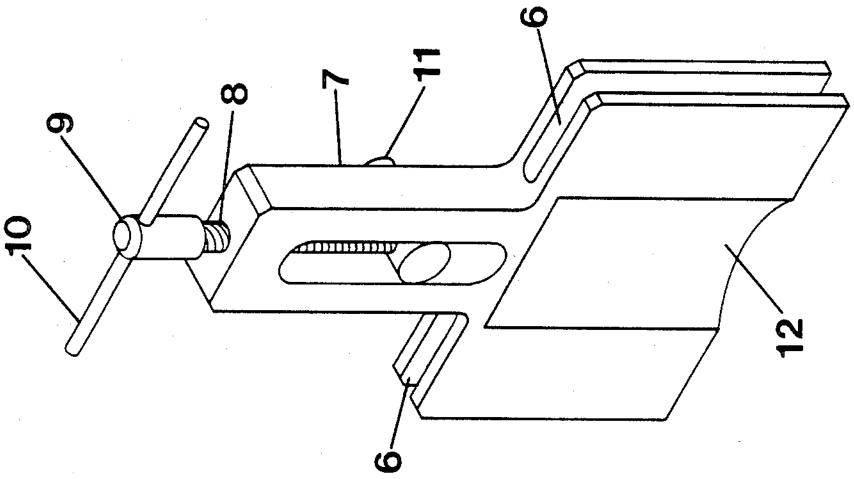
FIG. 2 is an isometric illustration of the rear of the Retractor apparatus.

The Retractor is illustrated in its entirety in FIGS. 1 and 2 and includes the triple-slotted Tee-frame 7, threaded shaft 8, top ferrule and handle (9 and 10 respectively), sprocket mounting lug 11, and concave rear recess 12. The mounting slots are identified by the numeral 6.

Rotation of handle 10 clockwise or counterclockwise results in vertical travel of the sprocket mounting lug 11. Existing head bolts are utilized in side slots 6 to secure the retractor to the engine block following head removal and allow for lateral adjustment of the Retractor. The concave rear recess, FIG. 2 reference 12, assures clearance of the cylinder and allows engine revolution.

Figure 3:
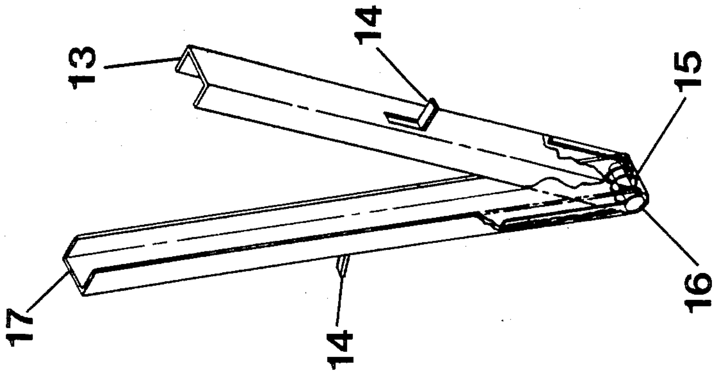
FIG. 3 is an isometric view of the Lock apparatus.

FIG. 3 illustrates the Lock which is comprised of side pieces 13 and 17, tabs 14, spring 15, and pivot pin 16. The spring 15 is formed to assure a maximum angle of 30 degrees between the Lock sides 13 and 17 and is of sufficient compressive strength to assure positive lock of the timing chain or belt which is engaged by lugs 14. The two sides of the Lock are compressed toward each other and the Lock inserted between the sides of the timing chain or belt prior to head removal. The Lock is bottomed on the crank sprocket and released. Lugs 14 penetrate the voids in the chain or lugs on the timing belt, the spring tension of 35 pounds being sufficient to lock the chain or belt in position.

Figure 4:
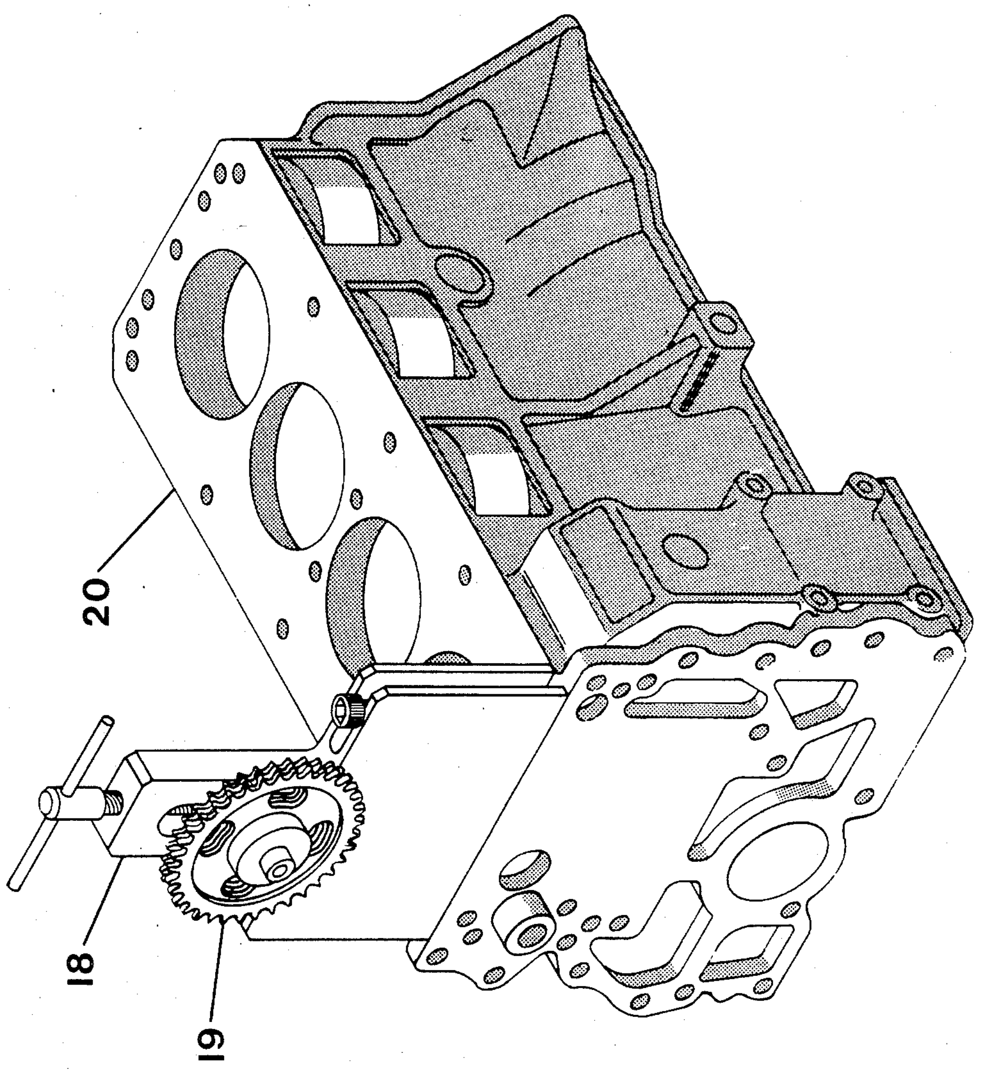
FIG. 4 is an isometric drawing of the Retractor installed upon a typical four cylinder block.

FIG. 4 shows the Retractor assembly 18 mounted on a typical 4 cylinder engine block 20 following head removal with cam sprocket 19 attached.

Figure 5:
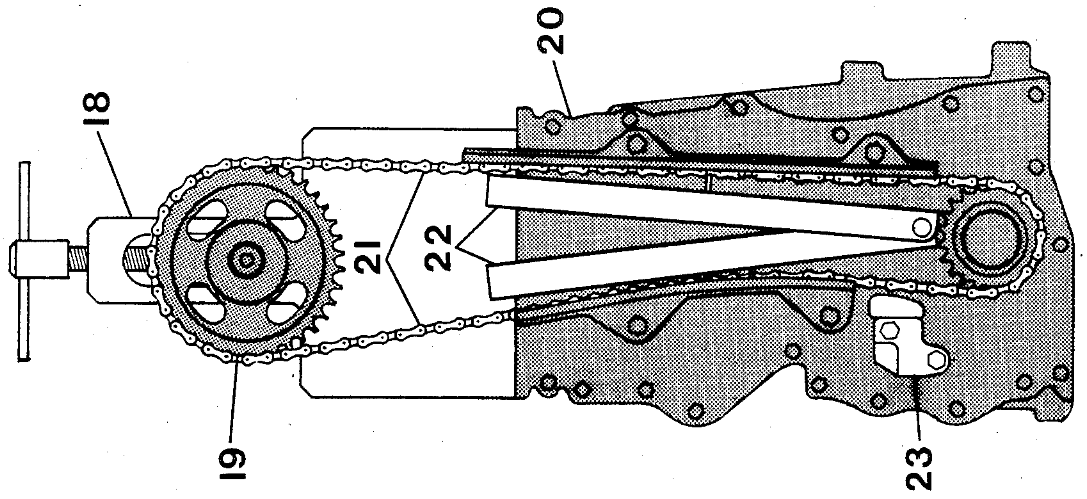
FIG. 5 is a front view of the Retractor and Lock as installed prior to Lock removal.

FIG. 5 illustrates the Retractor 18 mounted on the engine block 20 with the cam sprocket 19, chain 21, and Lock 22 installed prior to Lock 22 removal. Engine chain tensioner 23 is shown being retained in position by the tensioned chain 21. It should be noted that the engine front cover has been removed in FIG. 4 and 5 in the interest of clarity.

While a preferred specific embodiment of the invention is hereinbefore set forth, it si to be clearly understood that the invention is not to be limited to the exact constructions, mechanisms, and devices illustrated and described as various modifications of these disclosures may be provided in putting the invention into practice.

The claims for this invention are:

I claim:

1. Apparatus useful with an overhead cam internal combustion engine having an engine head, a timing chain tensioner piston and at least one cylinder, said apparatus being used for retracting and tensioning a timing chain or belt of said overhead cam internal combustion engine after removal of the engine head, the apparatus acting to prevent dislodgement of the timing chain tensioner piston, the engine having an engine block with at least two front head bolt holes formed therein, which bolt holes normally receive head bolts to maintain the engine head on the engine block, the engine further having a cam sprocket and a crankshaft sprocket mounted thereon and about which sprockets the timing chain or belt normally is carried, comprising:

a frame member having mounting slots for receiving the head bolts therethrough into the bolt holes in the engine block to mount the frame member to the engine block after removal of the engine head, the frame member having a first side and a second side, the first side facing the normal position of the timing chain and the second side facing the pistons of the engine, the second side having a concave recess formed therein which allows clearance of that cylinder nearmost the frame member to allow engine revolutions; and, means carried by the frame member for adjustably mounting the cam sprocket in a vertical direction to allow tensioning of the timing chain or belt on the cam sprocket and crankshaft sprocket while retaining the chain tensioner piston in position.

2. The apparatus of claim 1 wherein the frame member has a vertically extending frame portion and laterally extending frame portions disposed one each on opposite lateral sides of the vertically extending frame portion, the vertically extending frame portion having a vertical slot formed therein, an upper end of the vertically extending frame portion having a threaded aperture formed therein, the aperture communicating with the vertical slot, the apparatus further comprising:

a threaded shaft received for rotation within the threaded aperture and extending into the vertical slot, rotation of the shaft within the aperture acting to adjust the extension of the shaft into the vertical slot;

a sprocket mounting lug mounted to that end of the shaft extending into the vertical slot, the lug mounting the cam sprocket for rotation; and, means mounted to the opposite end of the shaft for rotating the shaft.

3. The apparatus of claim 2 wherein the mounting slots are formed one each in each of the laterally extending frame portions.

4. Apparatus useful with an overhead cam combustion engine having a cam sprocket, a crankshaft sprocket and an engine head, said apparatus being used for locking and holding a timing chain or belt of the overhead cam combustion engine on the crankshaft sprocket thereof on removal of the engine head and the cam sprocket normally carried by the engine head, comprising:

first and second elongated elements pivotally mounted together at first respective ends of said elements;

means joining the elongated elements for pivotal movement;

tab elements disposed on outer surfaces of the elongated elements, the tab elements extending outwardly of the elongated elements and being received respectively within voids of a timing chain or between lugs on a timing belt when the apparatus is disposed between sides of the timing chain or belt;

spring means carried by the elongated elements for biasing the elements apart to cause tension to be exerted against the sides of the chain or belt and to maintain the tab elements in position in said voids or between said lugs, thereby to hold the apparatus in position between the sides of the chain or belt and thereby holding and locking the chain or belt in place.

5. The apparatus of claim 4 wherein the spring means comprise a spring element having a spring tension of at least 35 pounds acting to bias the elongated elements apart about the pivotally joined ends thereof.

6. Apparatus useful with an overhead cam internal combustion engine having an engine block, an engine head, a timing chain tensioner piston and at least one cylinder, said apparatus being used for locking, retracting and tensioning a timing chain or belt of the overhead cam internal combustion engine on removal of the engine head to prevent dislodgement of the timing chain or belt and the timing chain tensioner piston, the engine having a cam sprocket and a crankshaft sprocket, the sprockets normally mounting the timing chain or belt therebetween, comprising:

first and second elongated elements pivotally mounted together at first respective ends of said elements;

means joining the elongated elements for pivotal movement;

tab elements disposed on outer surfaces of the elongated elements, the tab elements extending outwardly of the elongated elements and being received respectively within voids of a timing chain or between lugs of a timing belt when the apparatus is disposed between sides of the timing chain or belt; and spring means carried by the elongated elements for biasing the elements apart to cause tension to be exerted against sides of the chain or belt and to maintain the tab elements in position in said voids or between said lugs, thereby to hold the apparatus in position between the sides of the timing chain or belt and to hold and lock the chain or belt in place.

7. The apparatus of claim 6 wherein the engine has a block having at least two front head bolt holes formed therein, which bolt holes normally receive head bolts to maintain the head on the engine block, the apparatus further comprising:

a frame member having mounting slots for receiving the head bolts therethrough into the bolt holes in the engine block to mount the frame member to the engine block, the frame member having a first side and a second side, the first side facing the normal position of the timing chain and the second side facing the pistons of the engine, the second side having a concave recess formed therein which allows clearance of that cylinder nearmost the frame member to allow engine revolution; and, means carried by the frame member for adjustably mounting the cam sprocket in a vertical direction to allow tensioning of the timing chain or belt on the cam sprocket and crankshaft sprocket while retaining the chain tensioner piston in position.

8. The apparatus of claim 7 wherein the frame member has a vertically extending frame portion and laterally extending frame portions disposed one each on opposite lateral sides of the vertically extending frame portions, the vertically extending frame portion having a vertical slot formed therein, an upper end of the vertically extending frame portion having a threaded aperture formed therein, the aperture communicating with the vertical slot, the mounting means further comprising:

a threaded shaft received for rotation within the threaded aperture and extending into the vertical slot, rotation of the shaft within the aperture acting to adjust the extension of the shaft into the vertical slot;

a sprocket mounting lug mounted to that end of the shaft extending into the vertical slot, the lug mounting the cam sprocket for rotation; and, means mounted to the opposite end of the shaft for rotating the shaft.

9. The apparatus of claim 8 wherein the mounting slots are formed one each in each of the laterally extending frame portions.

* * * * *